United States Patent
De Munnik

[15] 3,650,322
[45] Mar. 21, 1972

[54] HEAT EXCHANGER

[72] Inventor: Nicholas Marie De Munnik, 450 Walmer Road, Apt. 409, Toronto, Ontario, Canada

[22] Filed: June 22, 1970

[21] Appl. No.: 48,160

[52] U.S. Cl.............................................165/143, 165/83
[51] Int. Cl.....................................................F28f 9/26
[58] Field of Search.....................165/143, 153, 82, 83, 172, 165/173

[56] References Cited

UNITED STATES PATENTS 3,171,478  3/1965  Weiks.....................................165/143
2,229,344  1/1941  Schneider...........................165/143 X

FOREIGN PATENTS OR APPLICATIONS 634,004  10/1927  France....................................165/82

*Primary Examiner*—Frederick L. Matteson
*Assistant Examiner*—Theophil W. Streule
*Attorney*—George A. Rolston

[57] ABSTRACT

The following specification discloses an improved heat exchanger for cooling semi-solids and particularly provides a coolant jacket connector means constructed of stainless steel sheet metal capable of withstanding the expansion and contraction forces caused by the heat transfer from a mash tube to the jackets at the attachment point of the tube and jackets.

The connector comprises a pair of oval-shaped sheet metal stampings each being dished to form an upwardly curved edge. The curved edges are mated and welded together to form a rounded hollow elongated body. Each of the pair of oval-shaped dished sheets has a pair of circular openings with a flanged collars punched outwardly from the bottom of the dished sheet remote from the upwardly dished edge.

The pair of flanged openings on one side of the connector are dimensioned to fit over the ends of a pair of jackets and the pair of flanged openings on the other side of the connector are dimensioned to fit over adjacent lengths of a twist or turn of the mash tube.

6 Claims, 4 Drawing Figures

Patented March 21, 1972
3,650,322
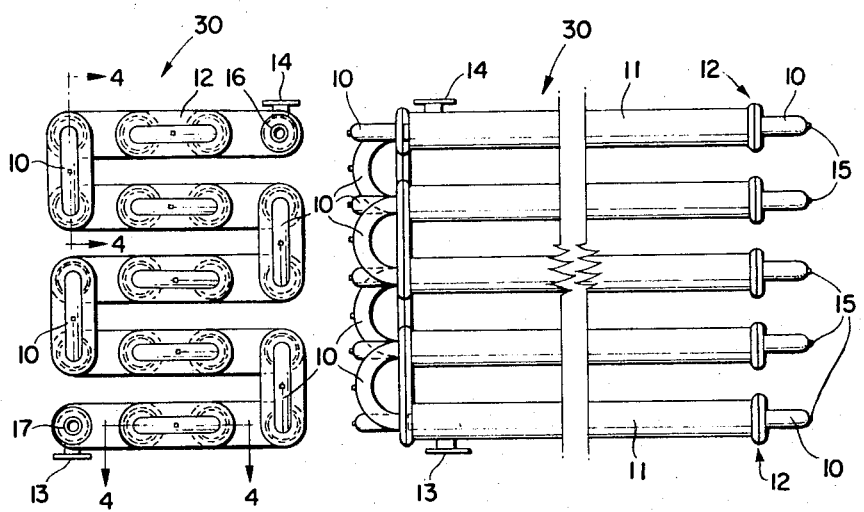
FIG.2   FIG.1
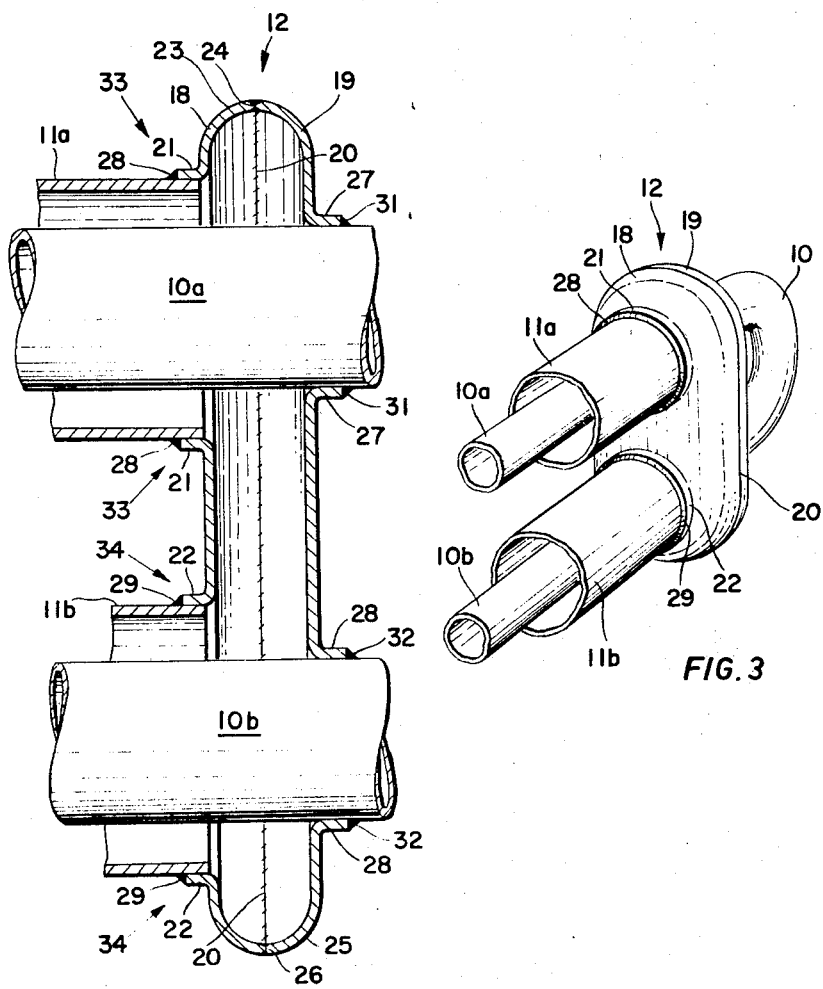
FIG.4
FIG.3
Inventor
NICHOLAS M. de MUNNIK
by: *George A. Rolston*

HEAT EXCHANGER

BACKGROUND OF THE INVENTION

Heat exchangers are known and used in the distillery arts to cool the mash to the prescribed temperature.

To affect the cooling process, the mash is passed through pipes or conduits which are surrounded by a coolant material. A tub or bath could be used to cool the mash in the pipes, but it is preferred to surround the mash conduits with a jacket carrying a flow of coolant material, such as water or other liquid. A radiator-type cooler having a header with a multiplicity of pipes attached to it flowing down into an outlet body and all under a pressure system cannot be used, since the mash is not sufficiently liquid to flow evenly through the pipes and an individual pipe could become too readily plugged with the mash or the mash flow unevenly through it, and thereby part of the mash would be cooled differently than other parts of it. In any event, some pipes would be plugged too easily and the flow of the mash stopped through part of the radiator.

It is known that it is difficult to surround, in the preferred manner, a mash-carrying conduit with a cooling jacket since the expansion and contraction of the conduit pipes within the jacket cause the joint where the conduit pipes emerge from the jacket to rupture and break with the expansion of the conduit causing leaking of the coolant liquid. Therefore, it has been well known in heat exchangers for the distillery arts that a jacket must have an expansible joint within it to avoid rupture when the conduit pipe has hot mash introduced to it causing the conduit pipe to expand. One known method of constructing a jacket to surround a mash-carrying pipe for cooling the mash within the pipe is to first space apart lengths of jacket pipe with holes precut and precontoured in the end surfaces of the jacket pipes to accommodate jacket connectors therebetween. Great care and accuracy is required when manufacturing and assembling the known connectors between adjacent jackets in order to maintain the exact required distance between the centers of the jackets to give the required distance for the U-bends being fitted to the product tubes.

The connectors of the present invention automatically space the product tubes the correct distance apart for abutting the U-bends. The known return or connector pipes are merely joining pipes, and usually of smaller cross section than the jacket. In order to withstand the expansion forces created by the heat of the mash within the tube, it is known to provide the jacket with an expansible joint in its middle section comprising a bellows-type of construction which is supposed to take up the force of the expansion against the jacket.

It is known in the construction of cooling jackets in heat exchangers, that when the jacket is made much larger than the surrounded mash carrying inner pipes, the pressure forcing the flow of the liquid coolant through the pipes must be very large to ensure that sufficient actual movement of coolant takes place at the surface of the inner pipe, since as is known from hydraulic studies of water movement, a barrier film of water caused by the friction of the pipe against the water will build up on the surface of the pipe and on the surface of the jacket with the water flowing between. This surface lamination or sheet of water will act as an insulator on the pipe inhibiting the transfer of the heat from the mash through the pipe into the water of the jacket. Therefore, it is necessary to make the jacket of a smaller dimension to ensure that under the proper pressure conditions, a flow of water is ensured past and across the pipes. However, with the construction of smaller pipes, the added disadvantage has been found of a hammering effect caused by the turbulence and constriction of the water as it turns in the return and connector pipes from one jacket surrounding one parallel of pipe to another jacket surrounding an adjacent parallel of mash tube or pipe.

It is, therefore, the principal object of this invention, to design a jacket for a mash-carrying conduit coil of pipes which will ensure that no rupture or breakage is caused with expansion of the conduit pipes upon introduction of the mash and which will be designed to reduce the film effect of the water within the jacket and also reduce the friction loss caused by the use of many connecting pipes.

When the cooling jacket is an outer pipelike structure surrounding the inner mash-carrying conduit it is necessary that the outer jacket be of sufficiently greater diameter than the inner conduit pipe to ensure that a smooth flow of cooling fluid is maintained within it, and to avoid the unnecessary turbulence and constriction within the jacket. It has been found that where the conduit pipe is formed into a twisted, flat serpentine coil form in order to obtain the maximum of space-saving for the heat exchanger structure, connector pipes can be used to join the jacket surrounding one length of coil of conduit pipe to carry the flow of coolant liquid onward to the next jacket. It has been found that an unnecessarily large amount of turbulence and hydraulic friction takes place in the connector pipes, thereby causing a decrease in the efficiency of the cooling effect of the water passing through. The buildup of friction caused by the use of a 90°-type connection between adjacent jackets that abruptly changes the direction of flow of coolant causes turbulence and decreases the rate of flow, thereby requiring a greater pressure to force the liquid through the system. If a lesser pressure is used, the velocity of coolant will decrease, resulting in friction increase in the return pipes, requiring a greater size of jacket, which obviously cannot be done and still keep the heat exchanger within manageable size. The alternative, when velocity remains the same and the pipes remain the same, is to provide a flow of colder water, or to provide connector return pipes constructed according the present invention.

It is the object, then, of the present system, to construct an improved jacket system for mash-carrying pipes of a heat exchange unit in a distillery by forming the jacket return pipe connectors of expansible sheet metal which can bear the expansion forces of the pipes carrying the mash without rupture and which also can conduct the flow of coolant less turbulently from one jacket surround to another.

SUMMARY OF THE INVENTION

The above-mentioned objects can be achieved by constructing a heat exchanger for cooling a flow of material passing through a length of tubing by first spacing apart a plurality of jacket pipes in a boxlike serpentine coil, then joining adjacent jacket pipes with one-half inner side connector of the invention. A length of mash tube is then inserted into each of the jacket members spaced apart by the one-half dished side of the connector. The other half of the connector is interfitted over adjacent pairs of lengths of mash tube, to space the mash tubes concentrically within the coolant jacket. Each connector is formed from sheet metal of sufficient size to diminish laminar friction of the cooling liquid as it enters that portion of the jacket thereby allowing the coolant to flow and change direction more freely from one conduit surround jacket to the next. After the mash tubes are concentrically held within the jackets by the connectors, U-bend tube members are butt welded to adjacent pairs of mash tubes to form the continuous length of mash-carrying tube. The U-bend ends are not surrounded by the coolant jacket.

In order to diminish the liability of rupture of the heated material-carrying conduit from the heat exchange jacket surrounding it, each of the jacket connectors becomes also the joining member for attaching the mash-carrying pipe to the jacket surround in such a manner that any expansion of the conduit is transferred to the jacket connector returns which absorb the expansion forces and protect the jacket. The heat transferred to the mash tube from the mash material carried by it will cause the whole tube to expand, thereby transferring the expansion forces to the whole system of deforming resistant jacket return connectors which are made to yield to the force.

In the present invention, the jacket return attachments are formed from a pair of oval-shaped sheet metal stampings welded together with rounded surfaces which are yieldable under small degrees of deformation when attached to surround a section of a tube carrying mash which expands when the hot liquid flowing material passes through it. Each oval-shaped side of the jacket connector attachment has stamped out of it a pair of circular collars to form circular flanged openings one above the other. The flanged openings are welded to the contacting surface of an upper and lower conduit tube or to an upper and lower jacket surround. When the tube carrying the hot mash expands, the curved surface of the connector flexes very slightly to take up the expansion. A pair of these sheet metal members are welded together to form the connector: one side attaches adjacent jacket members together and the other side attaches adjacent tube members together. Any expansion or contraction of any portion of the mash tube will be transferred through the tube body to all the connectors thereby spreading the stress and providing longer life to the structure. The series of return connector attachments act together as an accordion or spring to take up the expansion and contraction forces impressed upon the system during the introduction of hot mash into the tube of the conduit during the use of the heat exchanger.

Other advantages and benefits of the present invention will become apparent from a perusal of the description of a preferred embodiment of the invention hereinafter described in detail when taken in conjunction with accompanying drawings wherein similar reference numerals refer to similar parts in each figure of the drawings.

BRIEF DESCRIPTION OF THE DRAWINGS

FIG. 1 is a side elevation of a mash-carrying tube formed into a serpentine coil of parallel lengths surrounded by jacket members and showing adjoining jacket return connectors for attachment of the present invention;

FIG. 2 is an end view of the serpentine coil of tubes showing the end views of the mash tube attached to the jacket connectors;

FIG. 3 is an enlarged view of a jacket connector of the present invention shown attached to a pair of jacket pipes and is shown surrounding the mash-carrying conduit tube or pipe; and FIG. 4 is a sectional view of the jacket connector of FIG. 3 shown attached around an upper and lower jacket pipe with the mash-carrying conduit passing through and surrounded by the jacket connector and jacket tube or pipe.

DESCRIPTION OF A PREFERRED EMBODIMENT

Referring now in detail to the drawings, numeral 30 is a heat exchanger of the type employed in a distillery operation wherein 10 represents a mash conduit tube formed into a serpentine coil with individual lengths 10a, 10b, 10c of tube in parallel spaced apart relation and with heat exchange water-carrying coolant jackets 11 surrounding each of the parallel portions of the coil bundle of tubes 10. A return connector attachment 12 is shown to transfer coolant liquid from one jacket 11a surrounding one length of tube 10a to a jacket 11b surrounding a length of tube 10b next adjacent the length of tube 10a. An inlet 13 and an outlet 14 are shown positioned in an upper jacket surround and a lower jacket surround respectively. When in operation, a continuous flow of coolant water or other cold liquid is passed into inlet 13 which then flows throughout the jacket and emerges from outlet 14.

A plug 15 is provided at each of the unsurrounded U-bend ends of the tubes 10 so that whenever the tube 10 should be plugged with mash, a quick easy access to the interior of each of the lengths of the tube can be provided, thereby allowing for high pressure steam or the like to be forced through a portion of the tube to clean out the mash and any accumulated coatings on the inner sides of the tube. As is well known, having the end of the lengths of the tube open and unsurrounded by the jacket provides a great saving in dismantling and maintenance problems since the heat exchange jacket does not have to be removed for maintenance to the inner tube.

In FIG. 2, the mash tube 10 is shown with an inlet 16 and an outlet 17 which will be connected to suitable piping or tubing (not shown), for carrying the mash to the heat exchanger unit and for carrying the mash away from the heat exchanger to the subsequent step in the process. It will be seen that the inlet 13 for the coolant is at the bottom of the exchanger unit and the outlet 14 for the coolant is at the top of the unit, whereas the inlet 16 for the mash is at the top of the unit and the outlet 17 for the mash is at the bottom of the unit. The mash travels through the exchanger in one direction and the coolant flows through the exchanger counter to the flow of the mash in an opposite direction which is found to be the best method of obtaining optimum cooling results.

The improved connector 12 of the invention is shown in FIG. 4 and FIG. 3 of the drawings. The connector is indicated in FIG. 3 and 4 as numeral 12 and is shown in connected position between the section of mash tubing 10 and connecting the two adjacent jacket sections 11a and 11b. The figure shows the method of attaching the tubes 10, the jackets 11 and the connector 12.

The connector 12 is made from two separate sheets 18, 19 of oval-shaped stainless steel sheet metal. The sections 18, 19 are shown welded together at seam 20. Each sheet of oval-shaped sheet metal 18, 19 is of similar dimension, but each has different sized openings formed through them. The inner side 18 of connector 12 has formed within it, upper and lower flanged openings having outwardly extending collar flanges 21 and 22 which are dimensioned to receive respectively a jacket pipe 11a and a jacket pipe 11b which are disposed one above the other and over a tube section 10a and tube section 10b. During manufacture, the oval-shaped sheet 18 from which the one side of the connector 12 is formed is stamped into a dished shape having a curved portion 23 extending to its outer dished edge 24. During the stamping operation of the sheet 18 which forms it into the oval-shaped dish, two flanged collars 21, 22 are stamped outwardly from the bottom of the dish to provide the openings as discussed above. The whole body of the connector 12 is rounded in surface area. An outer side 19 of the connector 12 is similarly formed in oval-shaped dished appearance with an upwardly extending curved surface 25 and a circular outer edge 26. During the stamping operation which forms the stainless steel sheet 19 for the outer side of the connector 12 into a disc-shaped body, two openings are stamped into the lower bottom side of the dished body one above the other of equal size with outwardly extending flanged collars 27 and 28 which are dimensioned each to surround a section of the turned pipe 10a and 10b.

When the two oval-shaped dished members 18, 19 butt together with their side edges 24 and 26 mating, the connector body is formed to appear as a rounded hollow elongated body 12 having tow large collar portions 21 and 22 facing on one side and the two smaller flanged collar openings facing outwardly on the other side concentrically with the openings on the inner side. FIG. 4 shows how the jacket 11a surrounding a tube length 10a is concentrically held in position about the tube by the connector 12 when the connector 12 is in position.

The attachment of the jackets 11a, 11b with connector 12 is effected by weld 28 and 29 holding collars 21, 22 of side 18 of connector 12 to jackets 11a, 11b respectively. The jacket pipes 11a, 11b are first snugly fitted and spaced apart by the collars 21 and 22 of the inner body portion of the connector 12, thereby to give a good friction fit before welding. The outer side portion 19 of the connector 12 is first butt welded along seam 20 to side 18 to surround the lengths of pipe 10a and 10b which extend outwardly through collars 27, 28. Collars 27, 28 fit snugly around the tube 10a, 10b and hold them in concentric surrounded disposition within jackets 11a, 11b. The tube lengths 10a, 10b are then welded to collars 27 and 28 of outer body portions 19 of the connector 12 by welds 31, 32. Finally, the U-bends of pipe 10 are butt welded to the individual ends of pipes 10a, 10b extending through collar openings 27, 28 of connector side 19.

When the body 12 is welded together and welded to the pipes 11 of the jacket and the tubing 10 of the mash-carrying conduit, a rigid structure is obtained. By having the connector 12 formed of stainless steel and of a shape having curved surfaces throughout its body, any expansion or contraction forces being created in either of the jacket pipes 11a, 11b or the conduit tubing 10 must be transferred through the connector body 12 which being itself deformable and yieldable will take up the contraction forces thereby protecting the welds, joining the structure together, from rupture.

When the cold water or other liquid is passed through the jacket pipes 11, they contract, producing a force at 33, 34. The force does not break the welds 28, 29, 31 and 32 which hold the collars 21, 22, 27, 28 of the connector 12, to the jackets 11 and tubes 10 but is accepted into the body of the sheet metal forming the connector 12 which is curved to deform and thereby bear the force. In a similar manner, when the heat of the mash is transferred to the tube 10, a longitudinal expansion occurs to the tube 10 which is transferred to the welds 28, 29, 31 and 32 which in turn transfer the expansion force to the connector 12. The sheet metal body of the connector 12 is curved throughout its surface as shown especially by FIG. 3 and is thereby able to withstand deformation forces caused by the longitudinal expansion of the tube.

It will be apparent that heat differential between the tube 10 and jackets 11 at any point in the system will be transferred quickly throughout the system by the piping, allowing each connector 12 to dissipate a portion of the expansion forces. Each connector, in short, becomes a section of bellows.

It will be clear from the foregoing discussion that the jacket connectors of the present invention not only attach one jacket pipe to another to carry the flow of coolant through the exchange as is common in connectors in the heat exchanger, but the present invention provides the attachment also to be of itself the method of joining the mash tube to the connectors. It provides, then the novel dual purpose of jacket connector and tube attacher for the heat exchange unit.

It will be understood that the present invention can be used most advantageously as a heat exchange unit for other types of semisolid material which is being cooled by a liquid or other coolant material carried in a jacket to surround an inner semisolid carrying tube or body.

An added advantage of having the jacket connector returns attached also to the tube is that during assembly of the heat exchanger they are used as spacers to assure that each jacket pipe will be spaced apart concentrically about a length of mash tube without the necessity of using an initial spacer means.

The U-bends of pipe 10 can be attached to the pair of adjacent product tubes 10a, 10b by standard threaded union joints (not shown) or by vitaulac couplings, thereby permitting the U-bends to be removed to clear out the mash pipes.

The whole structure of jackets and connectors can be erected and assembled together before the product tubes are introduced, thereby allowing a tremendous saving in time in assembling and erecting the heat exchanger unit.

The foregoing is a description of a preferred embodiment of the invention which is given here by way of example only. The invention is not to be taken as limited to any of the specific features as described, but comprehends all such variations thereof as come within the scope of the appended claims.

What I claim is:

1. A heat exchanger comprising a plurality of open-ended spaced apart parallel conduits of substantially equal length;
   a plurality of U-bend conduits interconnecting the said open ends of adjacent ones of said spaced apart parallel conduits to form a continuous path for flow through said conduits;
   parallel jacket pipe means having open ends at each end thereof, surrounding a mid portion of each of said conduits;
   jacket pipe connectors extending between adjacent ends of adjacent pairs of said jacket pipe means forming the same into a continuous fluid flow path in heat exchange relation to said conduits;
   inner junction means of predetermined diameter extending between inwardly directed sides of said jacket pipe connectors and said jacket pipes for junction therewith;
   outer junction means of predetermined diameter extending between outwardly directed sides of said jacket pipe connectors and said conduits for junction therewith, and,
   extensible bellows means forming part of said jacket pipe connectors and extending completely therearound and located and spaced outwardly with respect to said diameters of said inner and outer junction means whereby to permit relative movement between said inner and outer junction means.

2. A heat exchanger as claimed in claim 1 when said conduits are tubular and wherein said jacket pipe means comprises a plurality of tubular metal members, each concentrically surrounding a portion of a length of parallel tubular conduit.

3. A heat exchanger as claimed in claim 1 wherein said conduits are dimensioned to protrude through said outer junction means defined in said jacket pipe connectors to provide ease of connection for said U-bends between adjacent pairs of parallel conduits.

4. A heat exchanger as claimed in claim 1 wherein said jacket pipe connectors comprise a pair of generally oval-shaped sheet metal stampings, said stampings being dished to form outwardly curved edges, said edges being butted one to another and welded to form said extensible bellows means.

5. A heat exchanger as claimed in claim 1 wherein said jacket pipe connectors comprise first and second generally oval-shaped dished sheet metal members butted one to another, each having a pair of circular openings with flanged collars punched outwardly therefrom forming said inner and outer junction means, said pair of flanged collars of said first sheet metal member being concentrically aligned with said pair of flanged collars of said second sheet metal member when said first and second members are butted one to another.

6. A heat exchanger as claimed in claim 5 wherein said pair of flanged collars on the first sheet members are dimensioned to snugly fit over the ends of a pair of adjacent jacket pipe means and wherein said pair of flanged collars on the second sheet members are dimensioned to fit over adjacent lengths of conduit, thereby locating the same concentrically within their respective jacket pipe means.

* * * * *